United States Patent
Hung

(10) Patent No.: US 8,745,368 B2
(45) Date of Patent: Jun. 3, 2014

(54) NOTEBOOK COMPUTER FOR PERFORMING PART OF POWER-ON SELF-TEST ACCORDING TO PROXIMITY SENSOR BEFORE DISPLAYING IMAGE AFTER POWER SWITCH IS TRIGGERED

(75) Inventor: Li-Te Hung, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 223 days.

(21) Appl. No.: 13/524,605

(22) Filed: Jun. 15, 2012

(65) Prior Publication Data

US 2013/0275738 A1    Oct. 17, 2013

(30) Foreign Application Priority Data

Apr. 11, 2012   (TW) ............................... 101112808 A

(51) Int. Cl.
*G06F 9/24* (2006.01)
*G06F 9/44* (2006.01)
*G06F 1/16* (2006.01)
*G06F 11/22* (2006.01)

(52) U.S. Cl.
CPC ............ *G06F 9/4403* (2013.01); *G06F 9/4418* (2013.01); *G06F 1/1684* (2013.01); *G06F 11/2284* (2013.01)
USPC .............................................. 713/2; 713/323

(58) Field of Classification Search
CPC ... G06F 1/1684; G06F 9/4403; G06F 9/4418; G06F 11/2284
USPC ...................................................... 713/2, 323
See application file for complete search history.

(56) References Cited

U.S. PATENT DOCUMENTS

| | | | |
|---|---|---|---|
| 6,330,676 B1* | 12/2001 | Kelsey ............................... 726/7 |
| 2012/0287031 A1* | 11/2012 | Valko et al. .................... 345/156 |
| 2013/0263252 A1* | 10/2013 | Lien et al. ........................ 726/19 |

* cited by examiner

*Primary Examiner* — Albert Wang
(74) *Attorney, Agent, or Firm* — Rabin & Berdo, P.C.

(57) ABSTRACT

A notebook computer is disclosed. The notebook computer comprises a display, a power switch, a proximity sensor, a memory, and a control unit. The proximity sensor and the power switch are disposed adjacent to each other for sensing an object approaching the power switch to output a sensing signal. The memory stores a basic input output system (BIOS). The control unit performs at least part of a power on self test (POST) according to the sensing signal and the BIOS before the display shows an image, and controls the display to display the image after the power switch is triggered.

12 Claims, 1 Drawing Sheet

NOTEBOOK COMPUTER FOR PERFORMING PART OF POWER-ON SELF-TEST ACCORDING TO PROXIMITY SENSOR BEFORE DISPLAYING IMAGE AFTER POWER SWITCH IS TRIGGERED

This application claims the benefit of Taiwan application Serial No. 101112808, filed Apr. 11, 2012, the subject matter of which is incorporated herein by reference.

BACKGROUND OF THE INVENTION

1. Field of the Invention

The invention relates in general to a computer, and more particularly to a notebook computer.

2. Description of the Related Art

After the power is turned on, the notebook computer will read a basic input output system (BIOS) to perform power on self test (POST). The POST tests or initializes hardware elements, and only after it is confirmed that hardware elements such as central processor, main memory, keyboard and mouse are all in a normal operation state will the display card be tested and initialized. And only after the test and initialization process of the display card are completed will the display show an image.

After pressing the power switch, the user still needs to wait for a period of time before the user can view the image shown by the display. Therefore, how to enable the user to view the image shown by the display promptly after pressing the power switch has become an important task for the industries.

SUMMARY OF THE INVENTION

The invention is directed to a notebook computer.

According to an embodiment of the present invention, a notebook computer is disclosed. The notebook computer comprises a display, a power switch, a proximity sensor, a memory, and a control unit. The proximity sensor and the power switch are disposed adjacent to each other for sensing an object approaching the power switch to output a sensing signal. The memory stores a basic input output system (BIOS). The control unit performs at least part of a power on self test (POST) according to the sensing signal and the BIOS before the display shows an image, and controls the display to display the image after the power switch is triggered.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
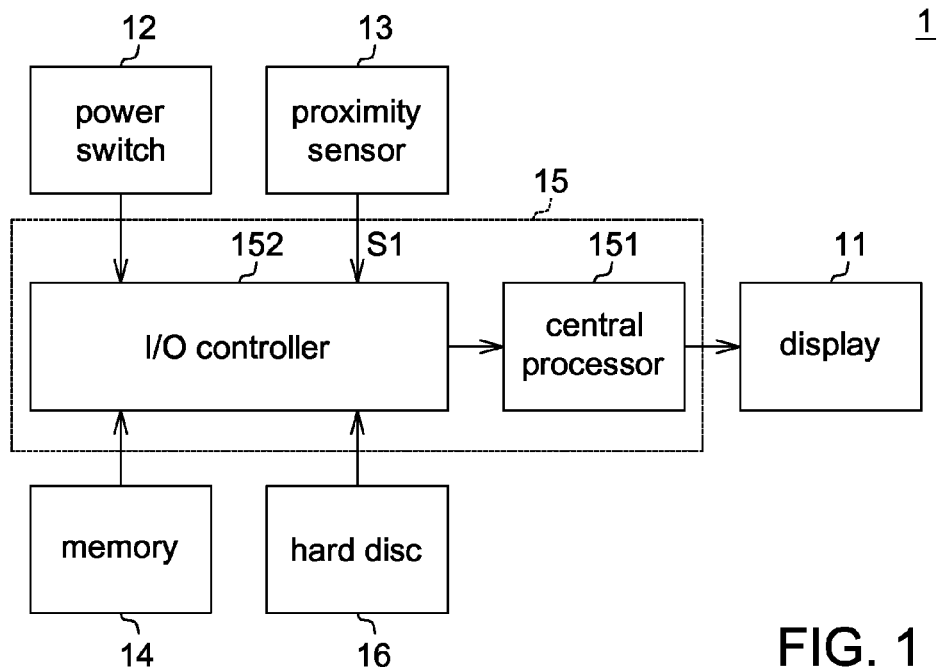
FIG. 1 shows a block diagram of a notebook computer according to a first embodiment.
Figure 2:
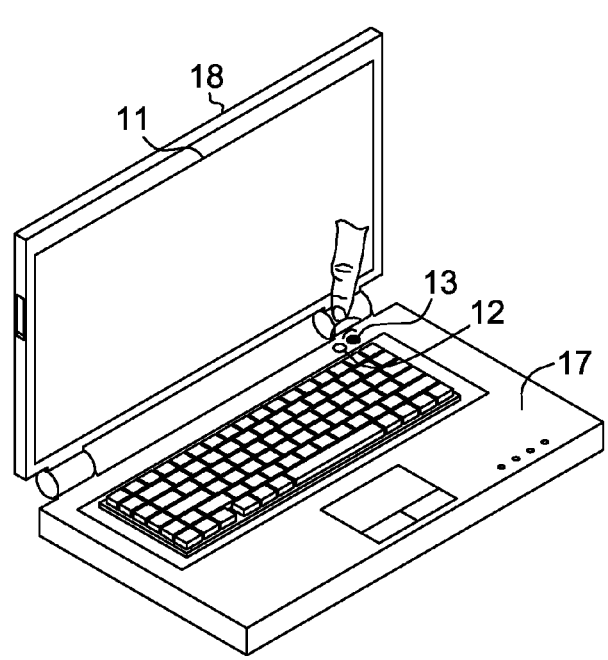
FIG. 2 shows an appearance view of notebook computer according to a first embodiment.

Referring to FIG. 1 and FIG. 2. FIG. 1 shows a block diagram of a notebook computer according to a first embodiment. FIG. 2 shows an appearance view of notebook computer according to a first embodiment. The notebook computer 1 comprises a display 11, a power switch 12, a proximity sensor 13, a memory 14, a control unit 15, a hard disc 16, a base 17 and an upper cover 18.

The control unit 15 further comprises a central processor 151 and an input/output controller (I/O controller) 152. The central processor 151 is coupled to the display 11. The input/output controller (I/O controller) 152 is coupled to the power switch 12, the proximity sensor 13, the memory 14 and the central processor 151. The I/O controller may be realized by an embedded controller (EC), a platform controller hub (PCH) or a fusion controller hub (FCH).

The upper cover 18 may be lifted from the base 17. The proximity sensor 13 and the power switch 12 are disposed on the base 17 and are adjacent to each other. The proximity sensor 13 senses an object approaching the power switch 12 to output a sensing signal S1. The object is such as a pen or a finger. For example, when the proximity sensor 13 senses an object approaching the power switch 12, the sensing signal S1 is at a high voltage level. Conversely, when the proximity sensor 13 does not sense any object approaching the power switch 12, the sensing signal S1 is at a low voltage level.

The memory 14 stores a basic input output system (BIOS). The control unit 15 performs at least part of a power on self test (POST) according to the sensing signal S1 and the BIOS before the display 11 shows an image, and controls the display 11 to display the image after the power switch 12 is triggered. The main task of the POST is to initialize and test each hardware element of the notebook computer 1 to assure the normal operation of the computer. For example, the POST confirms the size of the random access memory (RAM) and hardware elements. Hardware elements are such as central processor, main memory, keyboard, mouse or display driving circuit. The display driving circuit is such as a display card or an in-built display chip of a central processor.

For example, POST test and initializes the central processor, the main memory, the keyboard, the mouse and the display driving circuit. In order to reduce the time waiting for the display 11 to show an image, before the user presses the power switch 12, the notebook computer 1 completes a part of the POST for the central processor, the main memory, the keyboard and the mouse. After the user presses the power switch 12, the notebook computer 1 directly test and initialize the display driving circuit, so that the display 11 can promptly show an image.

To avoid unnecessary erroneous actions, only after the proximity sensor 13 has sensed an object approaching the power switch 12 for a first predetermined time (such as 1 second) will the control unit 15 perform the at least a part of the POST according to the sensing signal S1 and the BIOS before the display 11 shows an image.

To avoid unnecessary erroneous actions, if the power switch 12 has not been triggered for a second predetermined time (such as 3 seconds) larger than the first predetermined time, then the control unit 15 performs a shutdown process. The second predetermined time may also be set as the completion time of the POST. In another embodiment, the control unit 15 still doe not perform the shutdown process even the power switch 12 has not been triggered for the second predetermined time.

Second Embodiment

The advanced configuration and power interface (ACPI) allows the operating system to manage the power utilization state for various devices. The ACPI provides six power management modes S0~S5. The fast/quick POST needs to be performed to wake up the notebook computer 1 from a sleep state.

To reduce the wake-up time of the notebook computer 1, before the user presses the power switch 12, the proximity sensor 13 senses an object approaching the power switch 12 to output a sensing signal S1. In the sleep state, the control unit 15 performs at least a part of the POST according to the sensing signal S1 and the BIOS before the display 11 shows an image. Thus, after the user presses the power switch 12, the notebook computer 1 directly tests and initializes the display driving circuit so that the display 11 can promptly show an image.

Third Embodiment

The third embodiment is different the first embodiment mainly in that the control unit 15 of the third embodiment according to the sensing signal S1 and the BIOS before the display 11 shows an image performs at least a part of the POST and loads in an operating system. That is, before testing and initializing the display driving circuit, the third embodiment not only tests and initializes the central processor, the main memory, the keyboard and the mouse but further loads in an operating system from the hard disc 16. Thus, after the user presses the power switch 12, the display 11 can promptly show the wallpaper picture of the operating system.

To avoid erroneous actions and prevent unnecessary power consumption, after the power switch 12 has not been triggered for a third predetermined time, the control unit 15 performs a hard disc shutdown process. The third predetermined time may be set as the time starting from booting the computer until loading in the operating system. After the power switch 12 has not been triggered for a fourth predetermined time, the control unit 15 performs a shutdown process, wherein the fourth predetermined time is larger than the third predetermined time.

In another embodiment, despite that the power switch 12 has not been triggered for a fourth predetermined time, the control unit 15 does not have to perform the shutdown process.

Fourth Embodiment

In the fourth embodiment, the disclosed object is exemplified by an upper cover 18. The fourth embodiment is different the first embodiment mainly in that the fourth embodiment already performs at least a part of the POST when the upper cover 18 is lifted from the base 17. Then, after the user presses the power switch 12, the display 11 promptly shows an image.

Furthermore, when the upper cover 18 is lifted from the base 17, the control unit 15 performs at least a part of the POST according to the sensing signal S1 and the BIOS before the display 11 shows an image. For example, the control unit 15 tests and initializes the central processor, the main memory, the keyboard and the mouse. After the user presses the power switch 12, the notebook computer 1 directly tests and initializes the display driving circuit so that the display 11 can promptly show an image. After the upper cover 18 is lifted from the base 17, if the power switch 12 has not been triggered for a fifth predetermined time, the control unit 15 performs a shutdown process to avoid unnecessary power consumption. The fifth predetermined time may be set as the completion time of the POST.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A notebook computer, comprising:
   a display;
   a power switch;
   a proximity sensor disposed adjacent to the power switch for sensing an object approaching the power switch to output a sensing signal;
   a memory used for storing a basic input output system (BIOS);
   a control unit used for performing at least a part of the power on self test (POST) according to the sensing signal and the BIOS before the display shows an image, and controlling the display to display the image after the power switch is triggered.

2. The notebook computer according to claim 1, wherein if the proximity sensor has been sensing an object approaching the power switch for a first predetermined time, then the control unit performs at least a part of the POST according to the sensing signal and the BIOS before the display shows an image.

3. The notebook computer according to claim 2, wherein if the power switch has not been triggered for a second predetermined time larger than the first predetermined time, then the control unit performs a shutdown process.

4. The notebook computer according to claim 3, wherein the second predetermined time may be set as the completion time of the POST.

5. The notebook computer according to claim 1, wherein in a sleep state, the control unit performs at least a part of the POST according to the sensing signal and the BIOS before the display shows an image.

6. The notebook computer according to claim 1, wherein the control unit performs at least a part of the POST according to the sensing signal and the BIOS and loads in an operating system from a hard disc before the display shows an image.

7. The notebook computer according to claim 6, wherein if the power switch has not been triggered for a third predetermined time, then the control unit performs a hard disc shutdown process, and the third predetermined time may be set as the time starting from booting the computer until loading in the operating system.

8. The notebook computer according to claim 7, wherein if the power switch has not been triggered for a fourth predetermined time larger than the third predetermined time, then the control unit performs a shutdown process.

9. The notebook computer according to claim 1, further comprising:
   a base on which the proximity sensor and the power switch are disposed adjacent to each other;
   an upper cover, wherein when the upper cover is lifted from the base, the control unit performs at least a part of the POST according to the sensing signal and the BIOS before the display shows an image.

10. The notebook computer according to claim 9, wherein after the upper cover is lifted from the base, if the power switch has not been triggered for a fifth predetermined time, then the control unit performs a shutdown process.

11. The notebook computer according to claim 1, wherein the control unit comprises:
    a central processor coupled to the display;
    an input/output controller (I/O controller) coupled to the power switch, the proximity sensor, the memory and the central processor.

12. The notebook computer according to claim 11, wherein the I/O controller may be realized by an embedded controller (EC), a platform controller hub (PCH) or a fusion controller hub (FCH).

* * * * *